(12) United States Patent
Saliba et al.

(10) Patent No.: US 6,267,313 B1
(45) Date of Patent: Jul. 31, 2001

(54) WIDE TAPE CARTRIDGE

(75) Inventors: George A. Saliba, Northboro, MA (US); Steve Stamm, South Upton, CO (US); Chan Kim, Franklin, MA (US); Satya Mallick, Milcord, MA (US); Ken Cranson, Sterling, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/440,459

(22) Filed: Nov. 15, 1999

(51) Int. Cl.[7] .................................................. G03B 23/02
(52) U.S. Cl. ........................................... 242/345; 360/132
(58) Field of Search ................................ 242/345, 345.1, 242/345.2, 335; 360/132

(56) References Cited

U.S. PATENT DOCUMENTS

| | | | |
|---|---|---|---|
| 367,176 | * | 7/1887 | Barker . |
| 487,520 | * | 12/1892 | Gillette . |
| 695,639 | * | 3/1902 | Goerz . |
| 3,138,081 | * | 6/1964 | Nerwin . |
| 3,377,438 | * | 4/1968 | Schroter . |
| 3,650,489 | * | 3/1972 | Bresson et al. . |
| 3,664,595 | * | 5/1972 | Nerwin . |
| 3,677,487 | * | 7/1972 | Knowles et al. . |
| 4,019,695 | * | 4/1977 | Wharam . |
| 4,390,914 | * | 6/1983 | Nagai . |
| 5,620,265 | * | 4/1997 | Kondo . |

* cited by examiner

Primary Examiner—William A. Rivera
(74) Attorney, Agent, or Firm—Fish & Richardson

(57) ABSTRACT

A cartridge system using a wide recording tape disposed in the tape cartridge. The cartridge system includes a tape drive for moving the tape along a tape transport path, and a positioning mechanism for positioning a recording head relative to the recording tape. The wide tape cartridge includes a housing having a height which is smaller than both the length and the width of the housing. A tape assembly which has at least one supply tape reel and at least one take-up tape reel is disposed in the housing. The recording tape has a tape width which is substantially equal to the width of the housing. The rotation axes of the reels extend substantially parallel to the width of the housing.

24 Claims, 9 Drawing Sheets

WIDE TAPE CARTRIDGE

BACKGROUND OF THE INVENTION

This application relates to the field of data storage devices and more particularly to the field of magnetic tape storage devices using a wide tape cartridge.

One device for the storage of electronic data is a tape cartridge having one or two reels and containing a length of recordable magnetic tape. One common type of cartridge has wide top and bottom cartridge members connected by relatively narrow front, back and side cartridge portions. The reels rotate about respective spaced-apart axes which are perpendicular to the wide top and bottom cartridge members. The tape has typically a width comparable to the height of the narrow cartridge portions and moves parallel thereto for recording and reading data. In typical data storage applications, the tape width is between ½ inch and 1 inch. The tape is fed from the cartridge to a reading device through a hinged door in the surface of the cartridge. These cartridges are widely used for storage of crucial data, files, and information because they are inexpensive and capable of storing a large quantity of information.

Data are recorded on parallel recording tracks extending along the tape transport direction. Modern tape drives using ½ inch wide tape in combination with STORM (Servo Track Optical Write Magnetic) technology may record several hundred parallel logical tracks, with each logical track containing 8, 16 or more physical tracks. The tapes may have a length of several hundred meters and may therefore have to be moved over a considerable distance before a specified file can be accessed. File access with tape storage devices therefore tends to be relatively slow, typically in the order of several ten seconds to several minutes.

Larger quantities of data may be stored and accessed online by arranging the data tapes in juke-box type storage cabinets, with each cabinet holding tens or hundreds of tapes. Robotic tools may be used to automatically remove a requested tape from its storage slot in the cabinet and insert the tape into a tape drive.

It would therefore be desirable to provide a tape cartridge and a tape recording system which allows faster access to the files recorded on the recording tape. It would also be desirable to use existing storage facilities and robotic tools with the different types of tape cartridges.

SUMMARY OF THE INVENTION

The present invention is directed to a wide magnetic recording tape which is housed in a tape cartridge that can be used with tape libraries adapted to use conventional ½ to ¾ inch wide data recording tapes. Unlike the conventional data recording tapes, however, the width of the tape according to the invention is substantially equal to the width of the tape cartridge of approximately 3½ inches. The tape cartridge has at least one supply tape reel from which the recording tape can be unwound and at least one take-up tape reel on which the recording tape can be wound. The rotation axes of the reels extend substantially parallel to one the wide directions of the tape cartridge.

According to another aspect of the invention, a cartridge system for a tape cartridge includes a tape drive for moving a wide recording tape disposed in the tape cartridge along a tape transport path, and a positioning mechanism for positioning a recording head relative to the recording tape. The tape cartridge has at least one supply tape reel from which the recording tape can be unwound and at least one take-up tape reel on which the recording tape can be wound. The rotation axes of the reels extend substantially parallel to one the wide directions of the tape cartridge.

According to yet another aspect of the invention, a method is described for recording information on a wide recording tape disposed in a tape cartridge. The method includes moving the wide recording tape to a predetermined tape location along a tape transport path located inside the tape cartridge and positioning a recording head inside the tape cartridge at a predetermined position relative to the recording tape by moving the recording head perpendicular to the tape transport path while the tape is located inside the tape cartridge. The method further includes recording the information on at least one recording track extending substantially parallel to the transport path.

Embodiments of the invention may include one or more of the following features. The tape cartridge may have at least one tape guide disposed along a tape path extending between the supply tape reel and the take-up tape reel and an opening located in a side portion of the housing for enabling access to the recording tape. The recording tape may be unwound from a pair of spaced-apart supply tape reels and wound onto a pair of spaced-apart take-up tape reels, wherein the tape surrounds the pairs of supply and take-up tape reels, respectively. To tension the tape around the pairs of rollers, at least one of the pairs of supply tape reels and take-up tape reels may be surrounded by a resilient belt to which the tape is attached. Alternatively or in addition, the tape reels of at least one of the pairs of supply tape reels and take-up tape reels are coupled by one of a gear or a belt. Tension between the roller pairs can also be applied by making one of the tape reels of at least one of the pairs of supply tape reels and take-up tape reels movable relative to the tape assembly perpendicular to the rotation axis of the tape reel. The tape reels may be urged apart by a resilient member, such as a spring. The tape guide may be disposed either between the supply tape reel and the take-up tape reel or on a side of the supply tape reel or the take-up tape reel, respectively, which faces away from the respective take-up tape reel or supply tape reel. The recording tape may wrap over the supply reel after passing over the recording head and before being taken up by the take-up reel. Likewise, the recording tape unwound from the supply reel may wrap over the take-up reel before passing over the recording head. The entire transport path of the recording tape may advantageously be located inside the housing during the recording process.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF PREFERRED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited to the following illustrative embodiments.

The systems and methods disclosed herein relate to wide tape cartridges. The cartridges described herein can provide increased storage capacity by storing a greater number of data tracks arranged perpendicularly to the direction of tape transport. The tape cartridge may be designed to be compatible with existing tape handling and storage devices. For purposes of clarity, the tape cartridges described herein will be described as cartridges for holding a length of tape, such as a length of recording tape for storing computer data, video data, analog signals or any other type of information that can be stored on a tape. However, it will be understood by one of ordinary skill in the art that the cartridges can be employed for other applications. In addition, data may be encoded in magnetic, optical, dielectric form and recorded and/or read by magnetic, optical and electric recording and reading devices, as is known in the art. In the following, "recording" is to include both the reading and writing of information on the tape.

Figure 1:
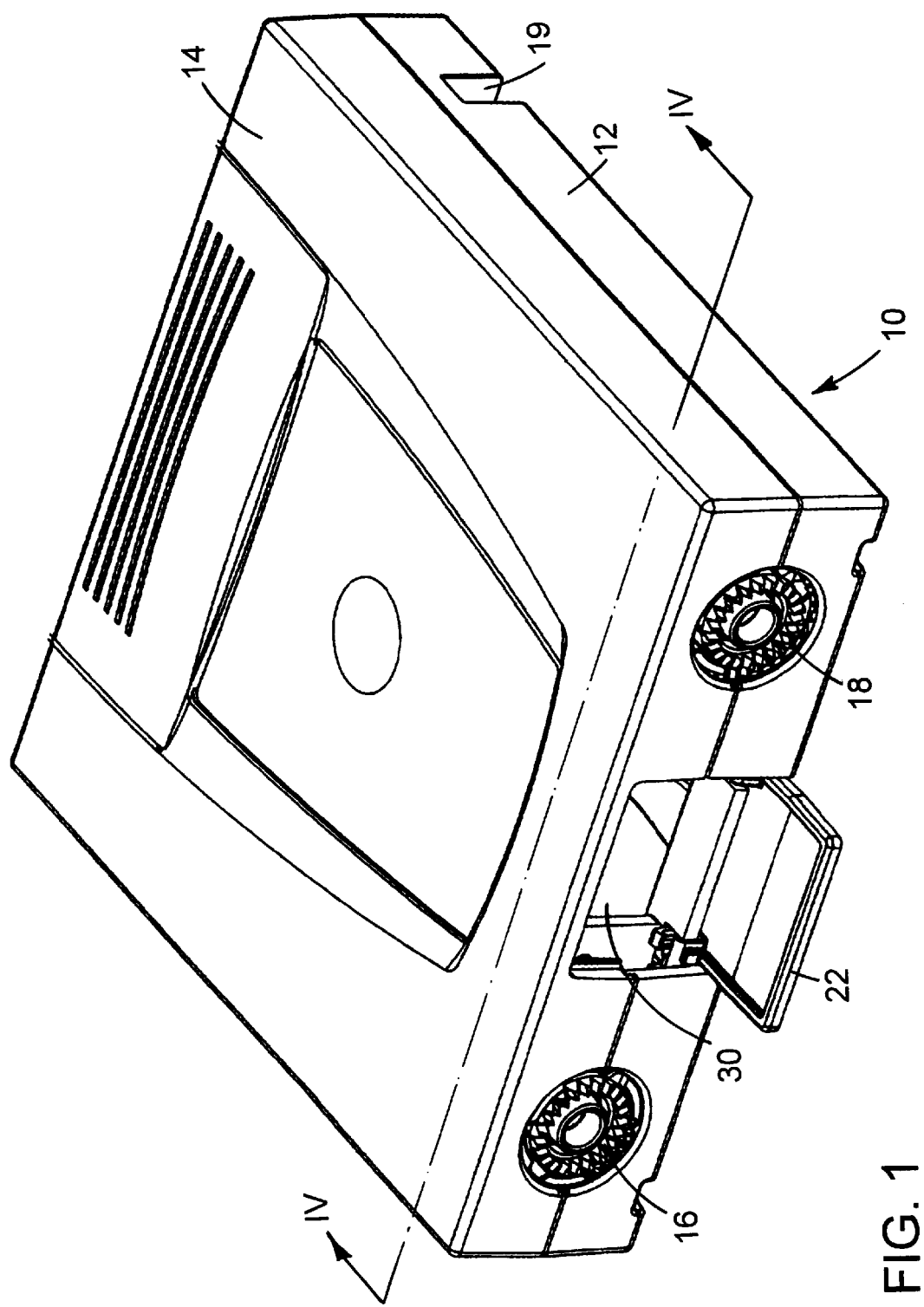
FIG. 1 shows a isometric top view of a first embodiment of a wide tape cartridge according to the invention.
Figure 2:
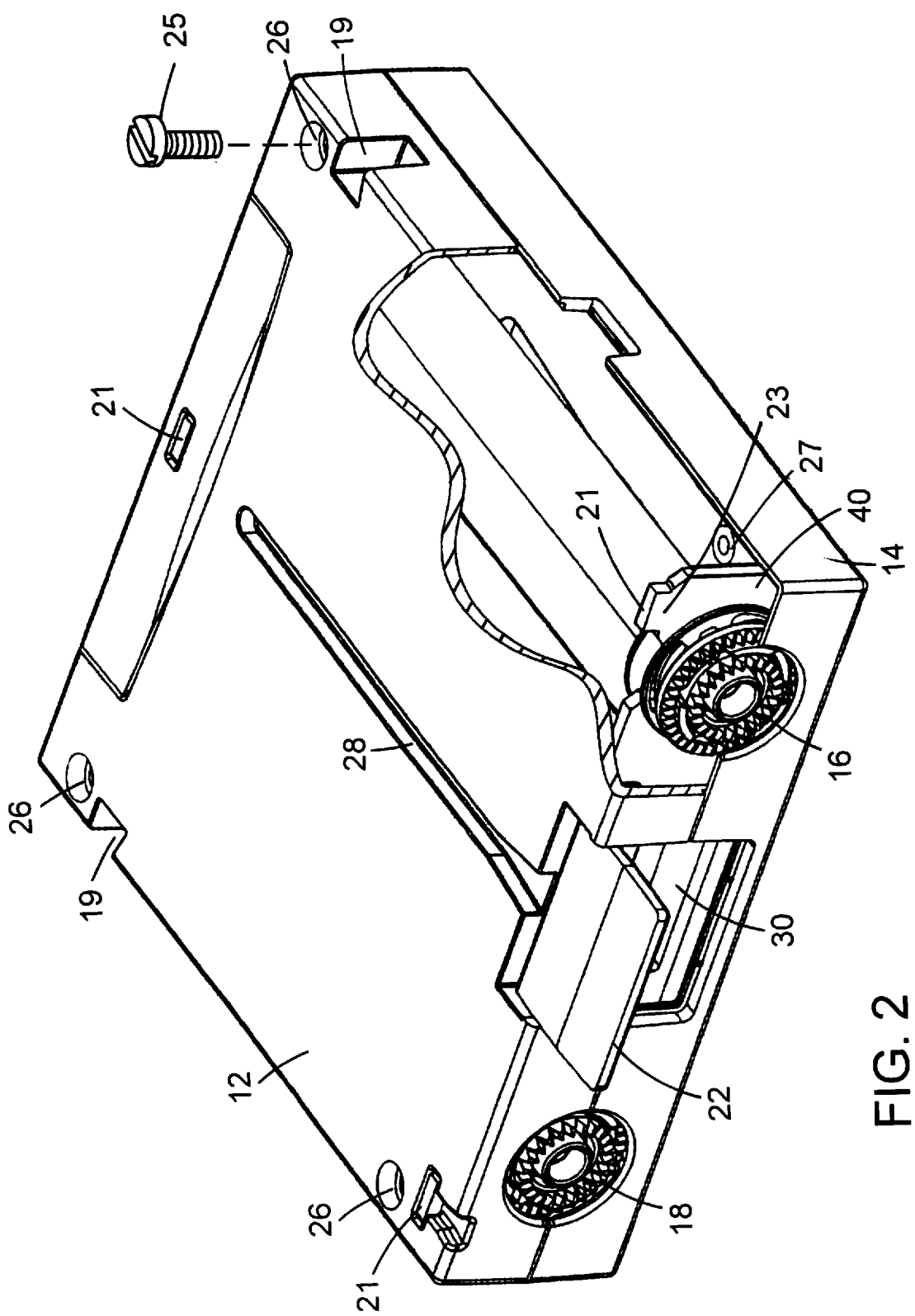
FIG. 2 shows a cut-away bottom view of the wide tape cartridge of FIG. 1.
Figure 3:
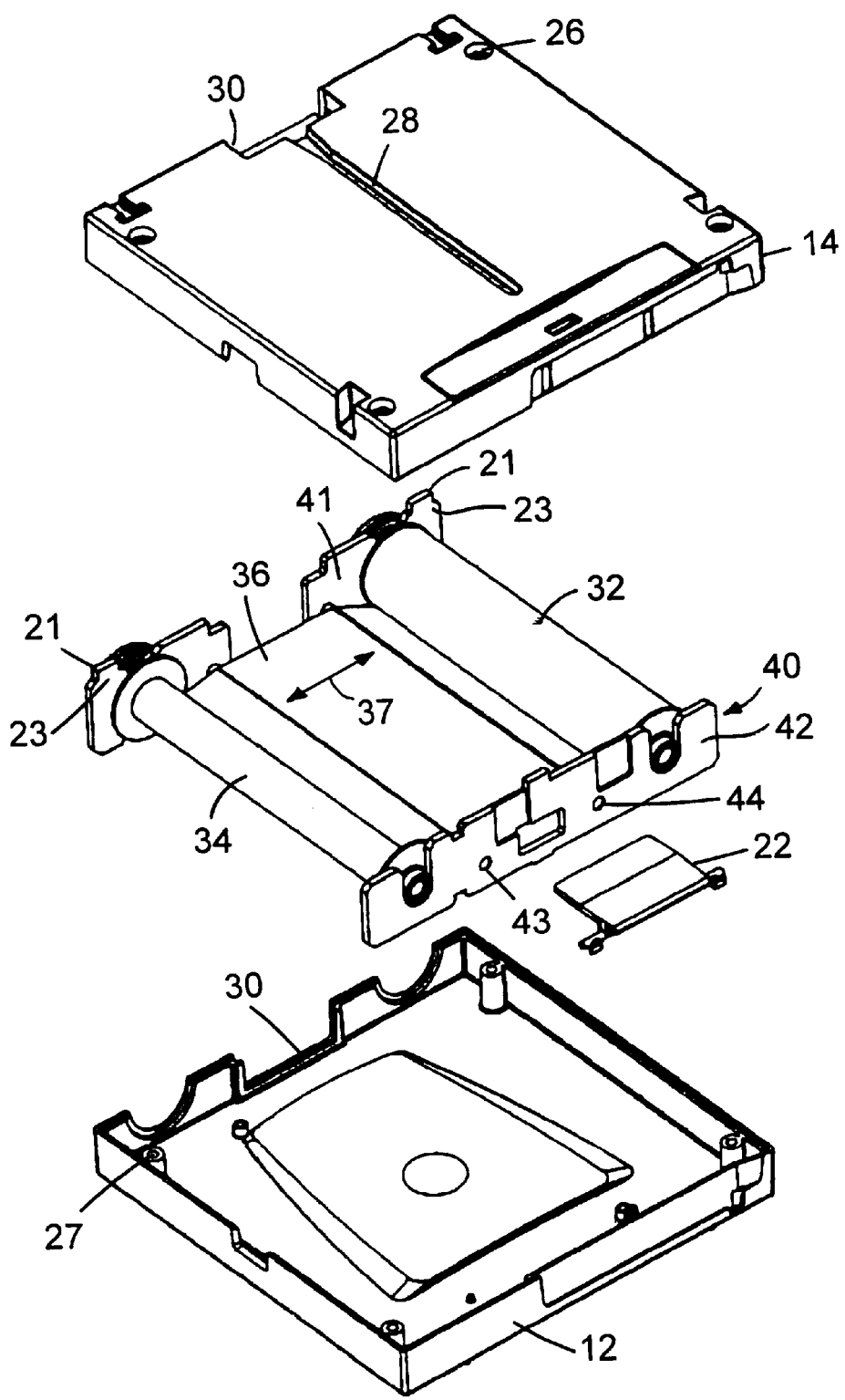
FIG. 3 shows an exploded view of the wide tape cartridge of FIG. 1.

Referring to FIGS. 1 to 3, a wide tape cartridge 10 includes a tape 36 housed in a housing which may include a lower housing member 12, an upper housing member 14 and a head access opening 30 adapted to receive a head actuator (not shown). The access opening 30 may be closeable with an access door 22. The tape cartridge 10 may further include a number of cartridge identification and registration features, such as one or more interposer notches 19 and a write-protect tab (not shown). The upper housing member 14 may be secured to the lower housing member 12, for example, mechanically through snap-in connections or with fasteners 25 which may be conventional screws, rivets and the like. In one practice, the upper housing member 14 may include a number of holes 26 mating with respective screw bosses 27 or holes provided on the lower housing member 12 and adapted to receive fasteners 25 for connecting the upper housing member 14 to the lower housing member 12. Alternatively or in addition, the upper and the lower housing member may also be joined using an adhesive or by a welding process, or by other processes known in the art.

As seen in FIGS. 2 and 3, the upper and lower housing members 12, 14 enclose a tape path assembly 40 which includes the wide tape 36 having a width of, for example, approximately 3½ inches. The tape 36 may initially be wound on a supply reel 32, with the free end of the tape 36 to be wound onto a take-up reel 34 to transport the tape 36 in a transport direction indicated by arrow 37. The supply reel 32 and the take-up reel 34 are supported for rotation by the tape path assembly 40 and have respective drive sockets 16, 18 adapted to engage with respective motor-driven drive couplings 78, 80 (FIG. 6) for transporting the tape 36 in the longitudinal transport direction. The top and bottom portion of the tape cartridge 10 may have a key, such as an exemplary transverse slot 28 located on the lower housing member 12, to ensure proper insertion and guiding of the cartridge relative to the head assembly 50. Tape guides 43, 44 are positioned between the reels 32, 34 to define a reference plane of the tape 36 so that the head assembly 50 can be inserted into the opening 30 for travel between the side members 41 and 42 of the tape path assembly 40.

The location of the tape path assembly 40 and therefore also of the tape 36 relative to the tape cartridge housing may be subject to, among others, manufacturing tolerances. To provide a more precise registration between the tape 36 and the drive assembly chassis 60 (FIG. 6) and thereby also with the head assembly 50 (FIGS. 4 and 5), the tape path assembly 40 may be supported in the drive assembly chassis 60 on datum surfaces 21, 23 located on the tape path assembly 40 and accessible from outside the tape cartridge 10. In the exemplary tape cartridge 10 of FIGS. 2 and 3, three datum surfaces are arranged essentially coplanar with a major surface of the lower housing member 12 and define a horizontal reference plane for aligning the wide tape cartridge 10 vertically relative to the drive assembly chassis 60. Additional datum surfaces 23 engaging with reference surfaces (not shown) located on the drive assembly chassis 60 may be used for registering the tape path assembly 40 in the horizontal reference plane.

Figure 4:
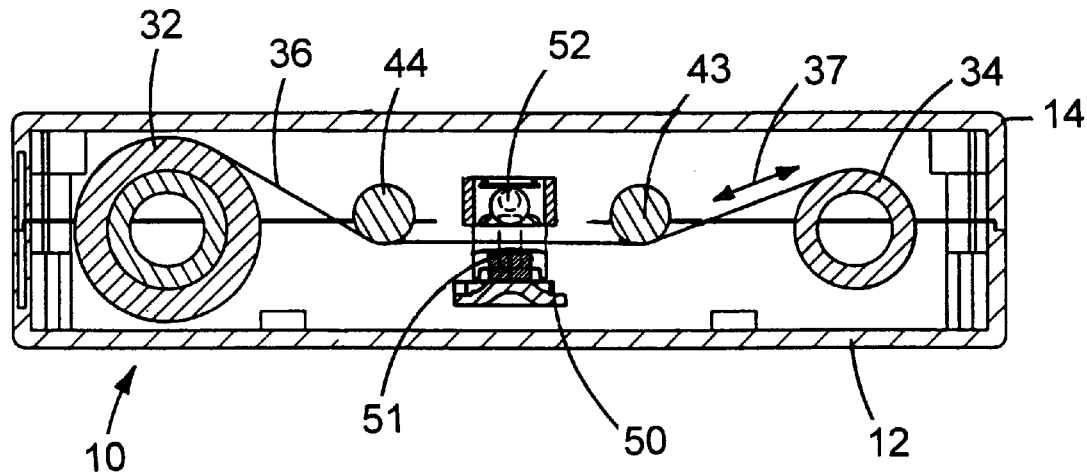
FIG. 4 shows a cross-sectional view taken along the line IV—IV of FIG. 1 with a head assembly in an idle position.
Figure 5:
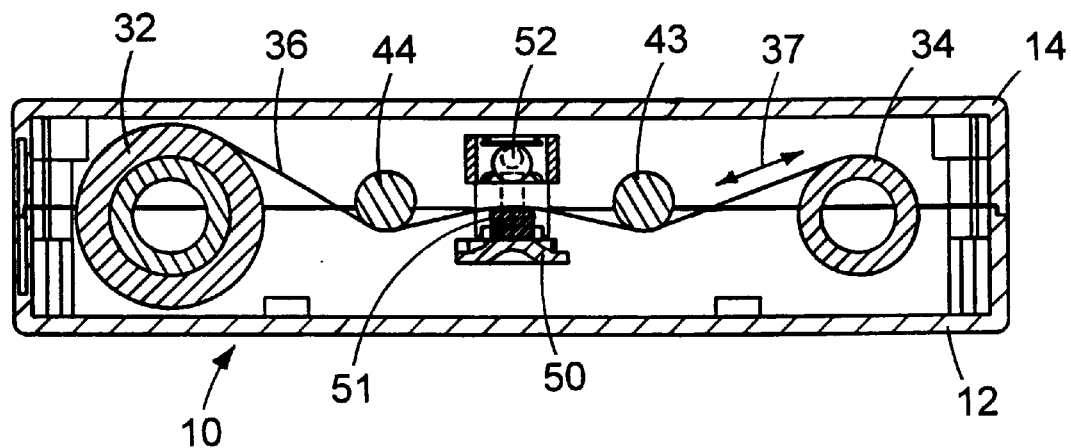
FIG. 5 shows a cross-sectional view according to FIG. 4 with the head assembly in an operating position.

FIG. 4 depicts a cross-sectional view of the wide tape cartridge 10 with the tape in an idle position and the head assembly 50 inserted through the opening 30. The head assembly 50 may include a conventional magnetic read/write (R/W) head 51 which may be capable of writing one physical track or a plurality of physical tracks. The head assembly 50 may be movable transversely to the tape transport direction indicated by the arrow 37 and can be actuated by a stepper motor and/or voice coil mechanism, as is known in the art. The head assembly 50 may also include an optical servo head 52 adapted to read optical servo tracks recorded on the tape for aligning the magnetic head 51 relative to the magnetic recording tracks. The optical servo tracks may be recorded on the non-recording side of the tape opposite the recording (magnetic) side. Such a system is described in co-owned co-pending U.S. patent application Ser. No. 09/191,321, which is incorporated herein by reference. The back-coating on the tape may have a regular pattern for servo tracking disposed along the longitudinal direction of the tape. The servo tracking pattern may include, for example, a series of discrete marks, such as pits or depressions, in the back-coating. The pattern also may include continuous depressed lines or grooves. The pattern can be formed, for example, by etching, cutting, engraving or burning the back-coating, e.g., mechanically or using a laser. The marks thus formed have optical properties which are different from the non-patterned region of the back-coating, and can be distinguished by the optical servo head 52.

Figure 6:
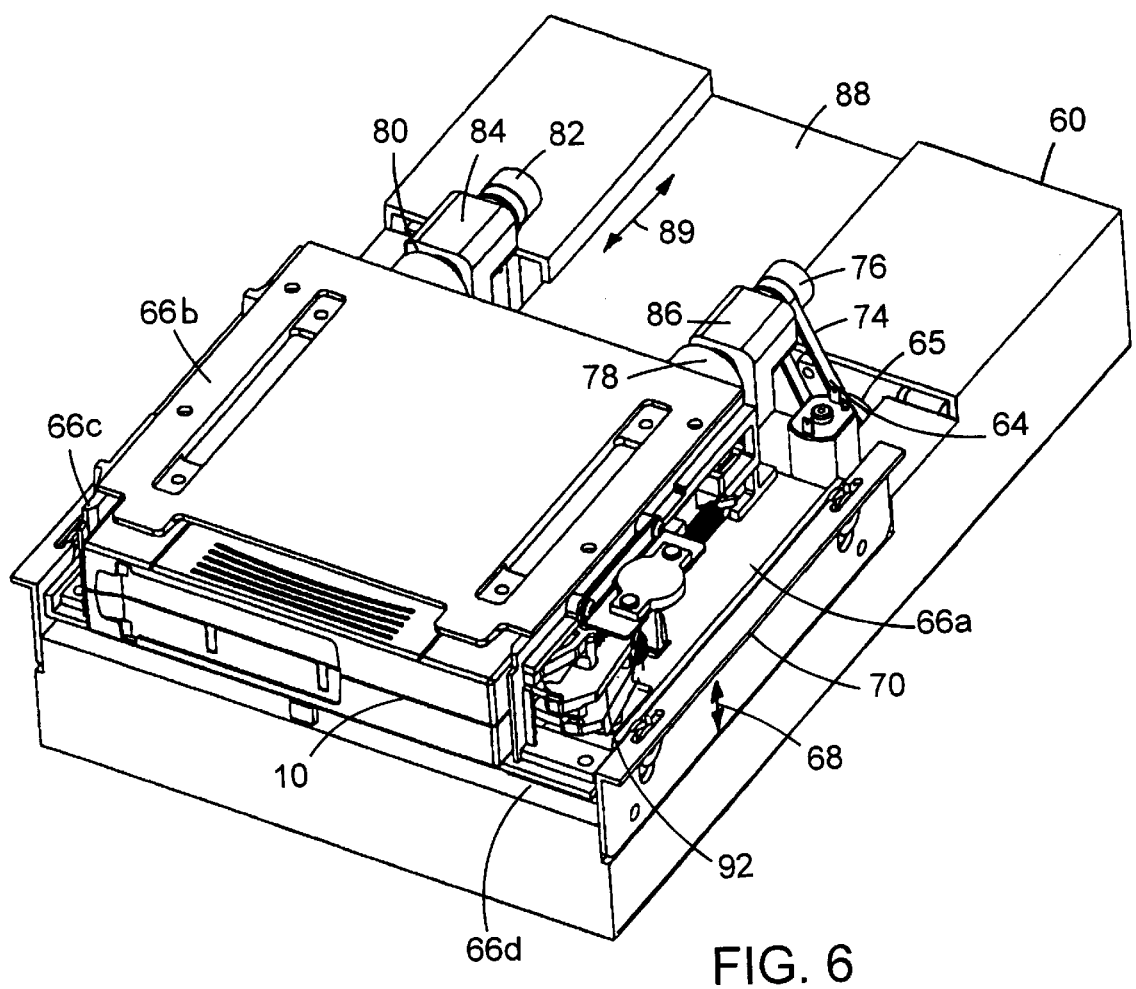
FIG. 6 shows a top view of a tape drive assembly for the wide tape cartridge according to the invention.
Figure 7:
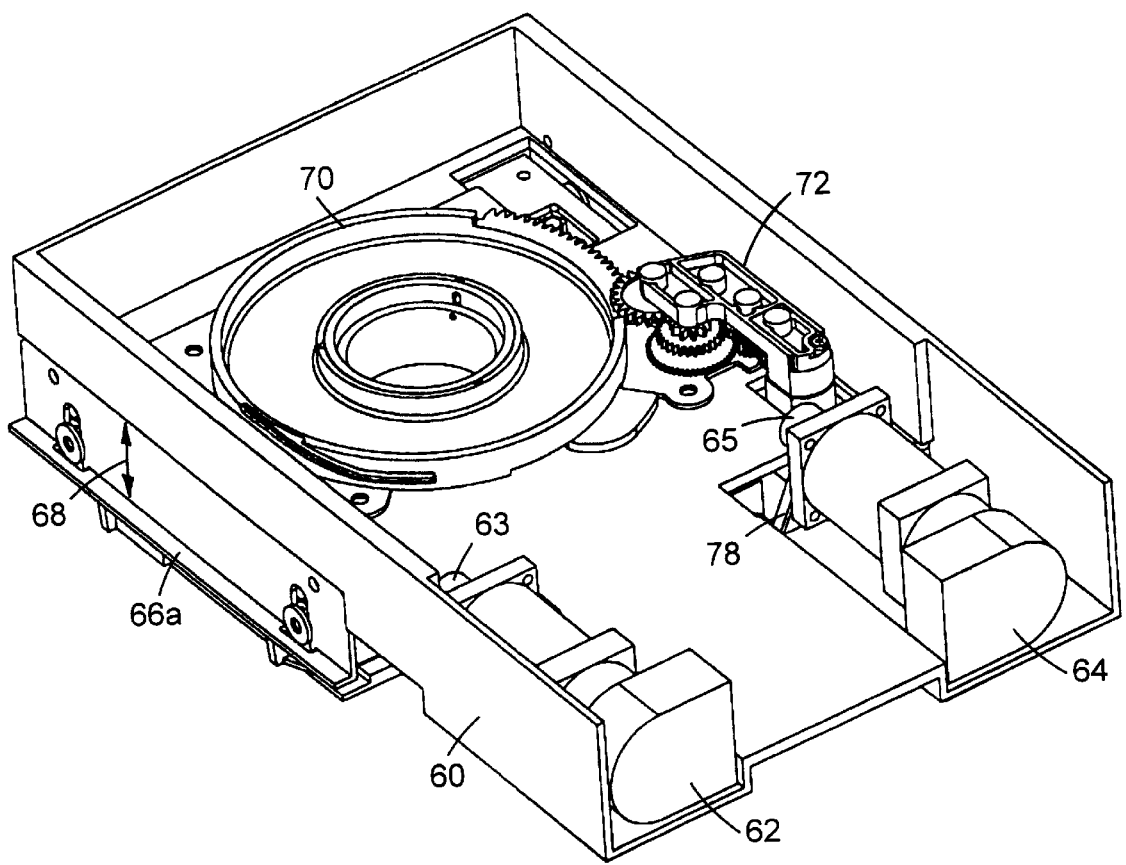
FIG. 7 shows a bottom view of the tape drive assembly of FIG. 6.

The head assembly 50 assumes the idle position shown in FIG. 4 when the wide tape cartridge 10 is initially inserted into the tape drive assembly 60 shown in FIGS. 6 and 7. After insertion of the tape cartridge 10 into the drive assembly 60, the tape cartridge 10 is moved into a read/write position relative to the head assembly 50, as will be discussed in detail below. In the read/write position illustrated in FIG. 5, the tape 36 is pulled taut over the R/W head 51 so that the head 51 is proximate to the magnetic recording surface of the tape 36. Close proximity between the R/W head 51 and the magnetic recording surface operates to achieve a high magnetic flux and recording density. The optical servo head 52 may not require physical contact with the tape surface to follow the servo tracks (not shown) and may, in some embodiments, therefore be distal from the tape surface.

As mentioned above, the wide tape cartridge 10 may be designed to have the same form factor as traditional tape cartridges using tape between ½ inch and 1 inch in width. A novel tape drive assembly 60 for operating the wide tape cartridge 10 will now be discussed with reference to FIGS. 6 and 7.

FIG. 6 shows the tape drive assembly 60 with the cartridge 10 inserted into a tape slot enclosed by a platform 66a, a top cover 66b and side covers 66c and 66d. The platform 66a is attached to a cartridge lift mechanism 70 which can raise and lower the platform 66a and thereby also the cartridge 10 with respect to the chassis of the drive assembly 60 in a vertical direction indicated by arrow 68. The tape drive assembly 60 further includes drive couplings 78, 80 which are adapted to engage with the respective drive sockets 16, 18 to rotate the tape reels 32, 34. Each of the drive couplings 78, 80 is secured together with a respective drive pulley 76, 82 on a common drive shaft (not shown) which is rotatably supported in bearing supports 84, 86 secured to the drive assembly 60. As more clearly seen from FIG. 7, which is a bottom view of the drive assembly 60 of FIG. 6, motors 62, 64 having drive pulleys 63, 65 are mounted on the drive assembly 60. The motors may be synchronous, asynchronous or stepping motors of the type used in conventional tape drives. The motor pulleys 63, 65 may be coupled to the drive pulleys 76, 82 via conventional belts 74. Those skilled in the relevant art will appreciate that other force-transmitting mechanisms, such as friction or toothed gears, may also be used. The cartridge lift mechanism 70 may be driven by a motor and a geared transmission 72 or by other lifting mechanisms known in the art. A head actuator (not shown) for actuating the head assembly 50 attached thereto may also be mounted, for example, a surface 88 on the drive assembly 60. The head actuator moves the head assembly 50 bi-directionally in a direction indicated by arrow 89. As seen from FIGS. 1 and 4–6, the head assembly 50 enters the tape cartridge 10 through the opening 30. The head actuator may be operated, for example, by a motor and/or a voice coil mechanism which provides coarse and/or fine positioning of the head assembly. The drive assembly 60 may also include a cartridge receiver mechanism 92 for sensing the presence and possibly also information about the type of a cartridge 10 in the drive assembly 60 as well as for opening the door 22 and locking the cartridge 10 in place.

As mentioned above, when the cartridge 10 is inserted into the cartridge bay, for example, a robotic tool (not shown), the tape is in the idle position illustrated in FIG. 3. The cartridge lift mechanism 70 is then actuated by the gear drive 72 and lowers the cartridge 10 with respect to the drive assembly 60 into the operating position in the direction of the arrow 68. At the same time, the drive couplings 78, 80 may engage the drive sockets 16, 18. In this position, the tape can be transported in either direction indicated by the arrow 37, and the magnetic head 51 is in close contact with the magnetic tape surface, ready to read and/or write data.

The data are recorded in a conventional manner by moving the tape 36 in the tape transport direction 37 and moving the R/W head 50 relative to the tape 36 perpendicular to the tape transport direction 37 for accessing the different recording tracks.

The greatest possible diameter of the supply and take-up reels of traditional tape cartridges using ½ inch or ¾ inch tape is approximately equal to the depth of the tape cartridge, which essentially corresponds of the length of the reels 32, 34 of the present invention. This is advantageous for storing a substantial length of tape. In contrast, with the wide tape cartridge 10 of the present invention, the greatest possible diameter of the supply and take-up reels 32, 34 including the tape is approximately equal to the height of the tape cartridge 10. Accordingly, the length of tape 36 that can be stored on one of the reels 32, 34 is less than that of conventional tape drives. It should be noted, however, that the wide tape 36 of the invention may be capable of storing more data per unit length than a conventional narrower tape due to its greater width, and access these data more quickly since less tape travel is required.

Figure 8A:
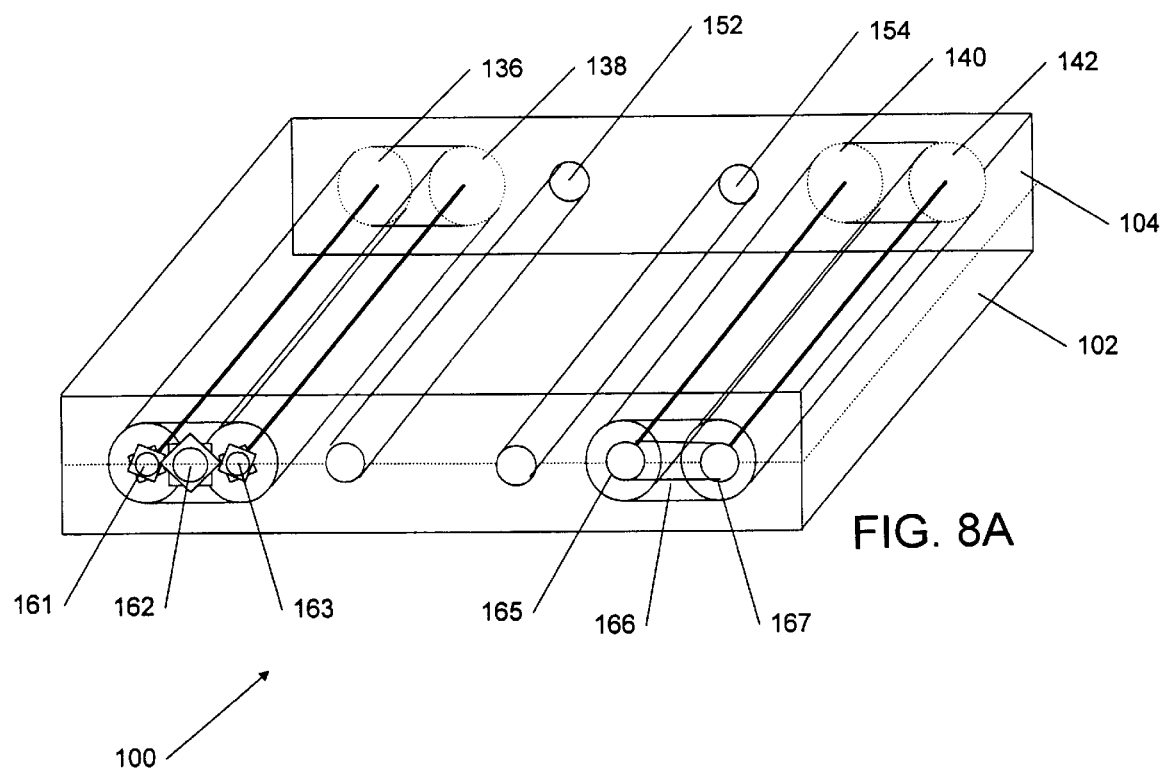
FIGS. 8A and 8B show a perspective view and a cross-sectional view of a second embodiment of the wide tape cartridge according to the invention.
Figure 8B:
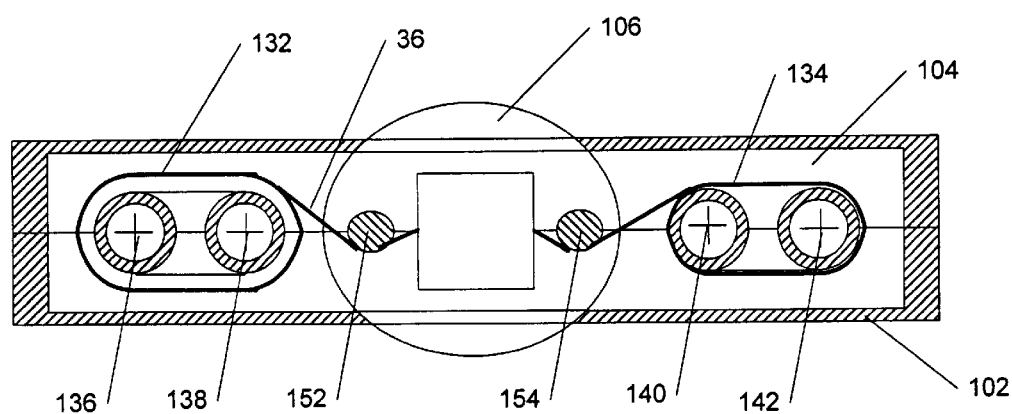

According to another embodiment of the invention illustrated in FIGS. 8 and 9, the supply reel 32 of the first embodiment depicted in FIGS. 2–4 may be replaced by at least two parallel spaced-apart supply reels 136, 138 which form a reel pair and rotate in unison. Likewise, at least two parallel spaced-apart take-up reels 140, 142 may be provided in lieu of the single take-up reel 34 of the first embodiment. As seen in FIG. 8B, the tape 36 may be looped around both supply reels 136 and 138 of the reel pair in a manner more closely described below with reference to FIG. 9. If an exemplary single reel 32 is capable of storing a length L of tape, then an additional length $L=L^* \, d/(\pi^* \, r)$ may be stored using two reels 136, 138, wherein r is an average radius of the reel including the tape wound on the reel and d is the spacing between the axes of the two reels 136, 138. This arrangement can easily double the tape storage capacity of the wide tape cartridge 10.

As indicated in FIG. 8A, the reels of the reel pairs 136, 138 and 140, 142, respectively, may be coupled to each other by a gear train, as indicated schematically by gears 161, 162 and 163, so that the reels 136 and 138 rotate in the same direction with the same rotation speed. Alternatively, the reels of the reel pairs 136, 138 and 140, 142, respectively, may be coupled to each other by a belt or chain 166 extending over pulleys 165, 167. The corresponding drive socket 16, 18 may be provided on either reel of the reel pairs 136, 138 and 140 and 142, respectively. The arrangement of the tape guides 152, 154 and the head assembly 106 of the second embodiment is essentially identical to that of the first embodiment.

Figure 9A:
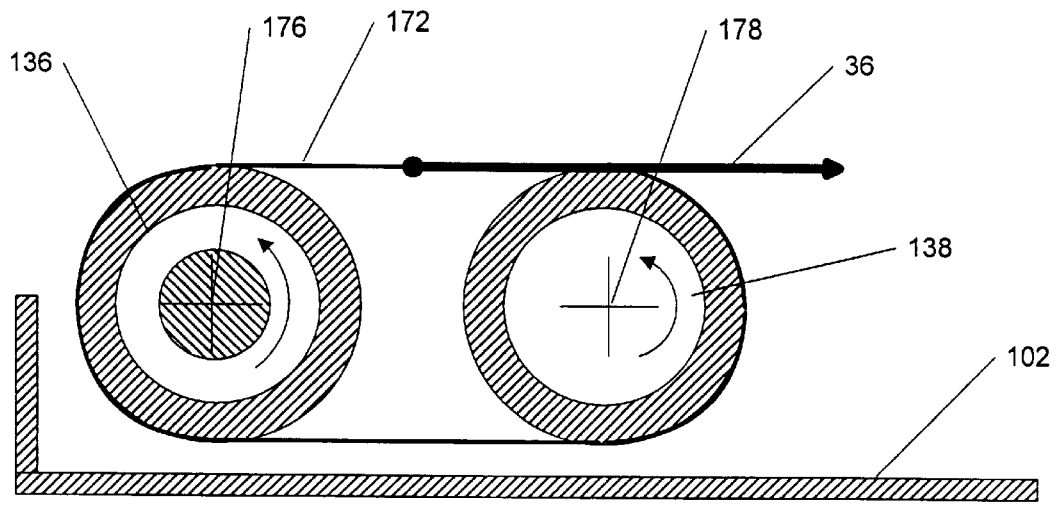
FIGS. 9A–C show various embodiments of roller drive mechanisms of the second embodiment of the wide tape cartridge.
Figure 9B:
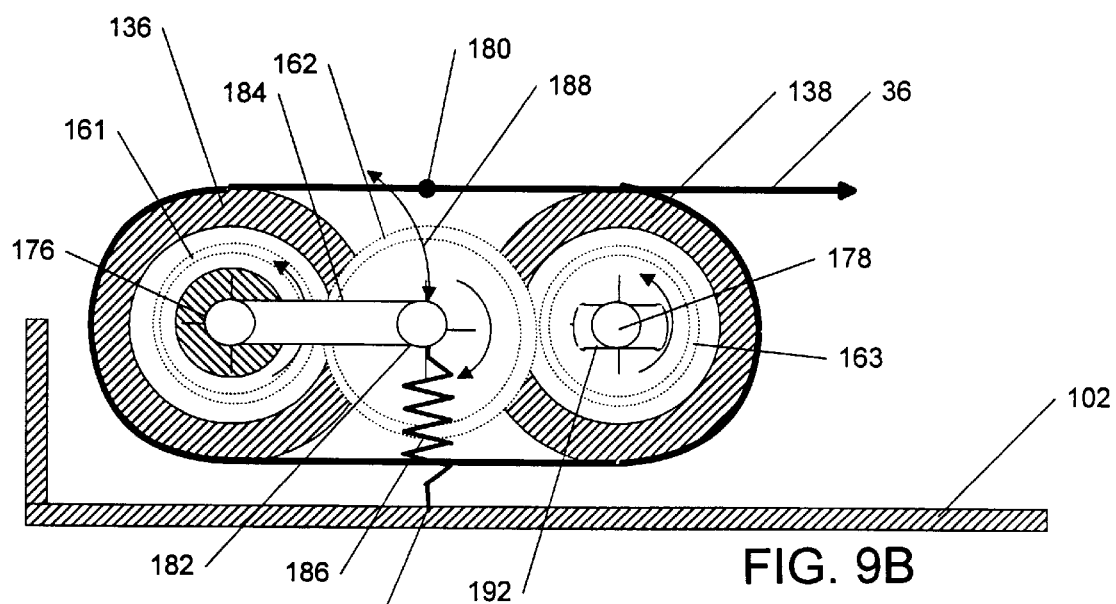
Figure 9C:
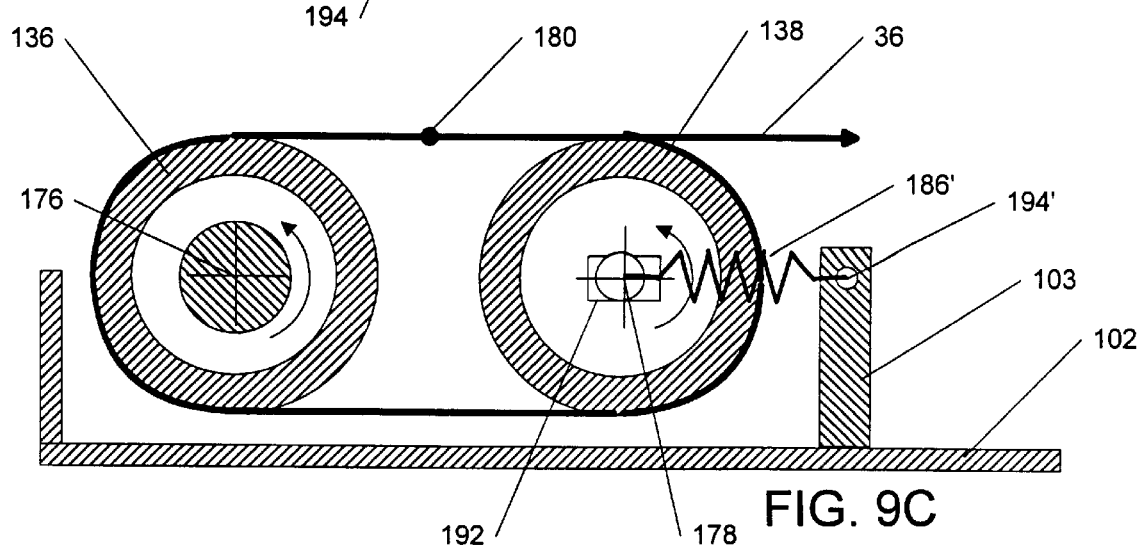

FIGS. 9A–9C illustrate different embodiments for attaching the tape 36 to the exemplary reel pair 136, 138 in order to ensure that the tape 36 is reliably transported and wound on and/or unwound from the reel pair 136, 138 without slippage when the reels 136, 138 rotate about their respective axes 176 and 178. In one practice depicted in FIG. 9A, the axes 176, 178 of the reels 136, 138 may be rotatably supported at fixed locations, with a continuous resilient belt 172 extending around both reels 136, 138. The reels and/or the belt may be provided with a non-slip surface. One free end of the tape 36 may be attached to the belt 172 at an attachment location 170, for example, with an adhesive. Alternatively, as shown schematically in FIGS. 9B and 9C, the axis 176 of a first reel 136 may be rotatably supported at a fixed location, whereas the axis 178 of the second reel 138 may be movable in a slot 192 extending essentially parallel to the transport direction of the tape 36. The two reels 136, 138 may be coupled, for example, by the toothed gear arrangement 161, 162, 163 also illustrated in FIG. 8A, with the gear 162 hingedly supported by a pivoting arm 184 which can rotate about the fixed axis 176. Advantageously, a spring 186 may be attached between a support axis 182 of the gear 162 and an attachment point 194 on the lower housing member 102. With this arrangement, the two reels 136 and 138 are urged apart, thereby applying tension to the tape 36 looped around the reels 136 and 138 and obviating the need for the resilient belt 172. A free end of the tape may be attached to a tape section at an attachment point 180, for example by fusing or with an adhesive. In another embodiment illustrated in FIG. 9C, the two reels 136 and 138 may be urged apart by a spring 186' attached with one end near the axis 178 of the movable reel 138 and with the other end at a location 194' to a stationary support 103 affixed to the lower housing member 102.

Figure 10:
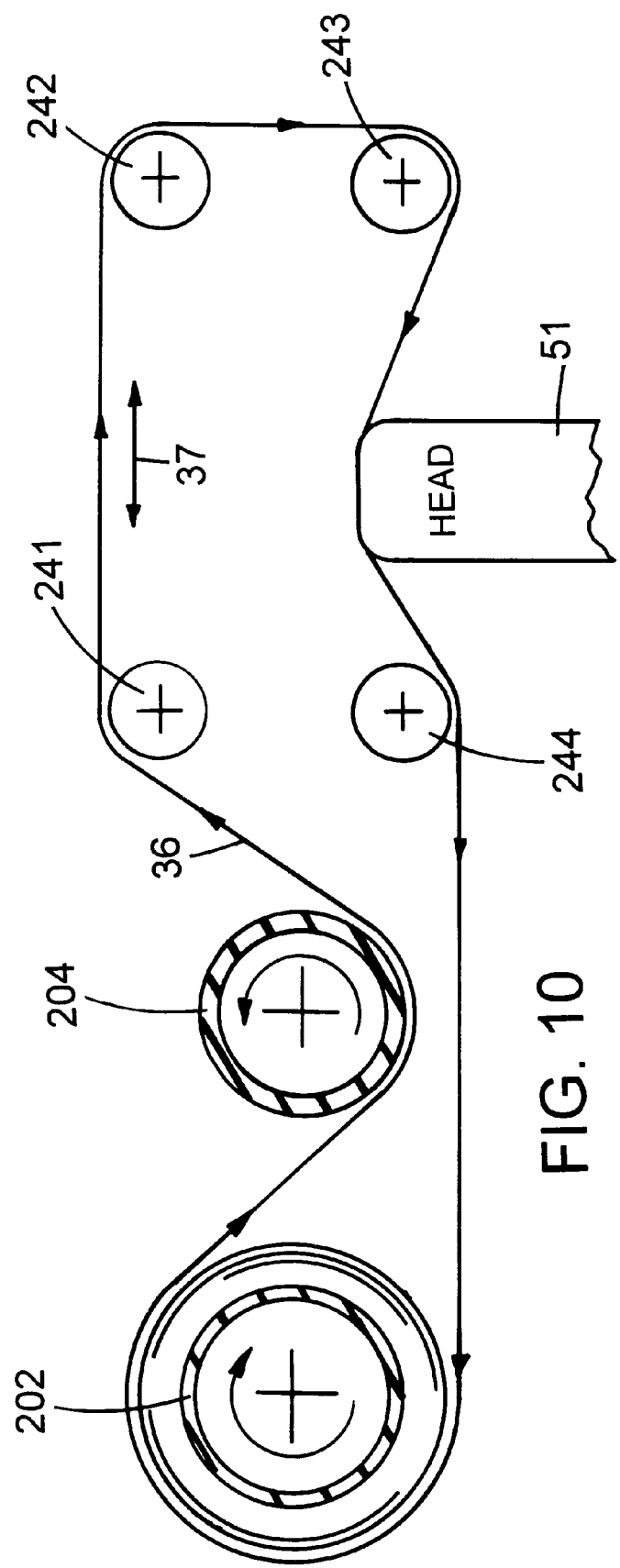
FIG. 10 shows a cross-sectional view of a third embodiment of the wide tape cartridge according to the invention.

FIG. 10 illustrates another embodiment of the wide cartridge 10 according to the invention. In this embodiment, the supply reel 202 may be located proximate to one lateral side of the wide cartridge 10, as illustrated for the reel 16 in FIG. 1. The take-up reel 204, however, may be located closer to the supply reel 202 than in the embodiment of FIG. 1. The spacing between the drive couplings 78, 80 would have to be adjusted accordingly. The tape 36 is unwound from the supply reel 202 and transported past the take-up reel 204 which rotates in the opposite direction as the supply reel 202. The tape 36 is guided over tape guides 241, 242, 243, 244, moving past a recording head 51 which may be placed between any of the tape guides 241, 242, 243, 244. The tape 36 then passes over the supply reel 202 at the same tape speed as the tape which is unwound from the supply reel 202. The tape 36 is then taken up by the take-up reel 204. It should be noted that the tape 36 over-wraps at both the supply reel 202 and the take-up reel 204, thereby "squeezing" out entrapped air between the tape layers for improved tape stacking. In addition, the longer tape path prides space for the additional tape guides 241, 242, 243, 244 in comparison to the embodiments discussed above with reference to FIGS. 1–9, which tends to decrease the edge forces exerted on the tape and to enhance the durability of the tape.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

We claim:

1. A wide tape cartridge for a magnetic recording tape, comprising:
   a housing having a width, a length and a height, said height being smaller than said length and said width, and
   a tape assembly disposed in said housing and comprising at least one supply tape reel and at least one take-up tape reel, said magnetic recording tape extending between said supply tape reel and said take-up tape reel and having a tape width which is substantially equal to the width of the housing,
   wherein said tape reels are rotatably mounted in the tape assembly so as to rotate about respective axes which are substantially parallel to the width of the housing.

2. The tape cartridge of claim 1, further comprising at least one tape guide disposed along a tape path extending between the supply tape reel and the take-up tape reel.

3. The tape cartridge of claim 2, wherein said at least one tape guide is disposed on a side of the supply tape reel which faces away from the take-up tape reel.

4. The tape cartridge of claim 2, wherein said at least one tape guide is disposed on a side of the take-up tape reel which faces away from the supply tape reel.

5. The tape cartridge of claim 1, further comprising an opening located in a side portion of the housing for enabling access to said recording tape.

6. The tape cartridge of claim 1, the tape reels further comprising drive sockets for rotating the tape reels to transport the tape along a tape transport path.

7. The tape cartridge of claim 1, wherein the recording tape is unwound from a pair of spaced-apart supply tape reels and wound onto a pair of spaced-apart take-up tape reels so as to surround the pairs of supply and take-up tape reels, respectively.

8. The tape cartridge of claim 7, wherein at least one of the pairs of supply tape reels and take-up tape reels is surrounded by a resilient belt to which the tape is attached.

9. The tape cartridge of claim 7, wherein the tape reels of at least one of the pairs of supply tape reels and take-up tape reels are coupled by one of a gear and a belt.

10. The tape cartridge of claim 7, wherein one of the tape reels of at least one of the pairs of supply tape reels and take-up tape reels is movable relative to the tape assembly perpendicular to the rotation axis of the tape reel and said movable tape reel is urged apart from the non-movable tape reel of said pair of tape reels by a resilient member.

11. The tape cartridge of claim 10, wherein said resilient member is a spring.

12. The tape cartridge of claim 10, wherein said tape surrounds the pairs of supply and take-up tape reels, respectively, and is tensioned around the respective pairs of supply and take-up tape reels by said resilient member.

13. The tape cartridge of claim 1, further comprising at least one tape guide disposed between the supply tape reel and the take-up tape reel.

14. The tape cartridge of claim 1, wherein the recording tape wraps over the supply reel after passing over the recording head and before being taken up by the take-up reel.

15. The tape cartridge of claim 1, wherein the recording tape unwound from the supply reel wraps over the take-up reel before passing over the recording head.

16. The tape cartridge of claim 1, wherein the entire transport path of the recording tape is located inside the housing during the recording process.

17. A cartridge system for a tape cartridge, comprising:
   a tape drive for moving a wide recording tape disposed in the tape cartridge along a tape transport path, and
   a positioning mechanism for positioning a recording head relative to the recording tape,
   said tape cartridge comprising:
      a housing having a width, a length and a height, said height being smaller than said length and said width, and
      a tape assembly disposed in said housing and comprising at least one supply tape reel and at least one take-up tape reel, said magnetic recording tape extending between said supply tape reel and said take-up tape reel and having a tape width which is substantially equal to the width of the housing,
      wherein said tape reels are rotatably mounted in the tape assembly so as to rotate about respective axes which are substantially parallel to the width of the housing.

18. The cartridge system of claim 17, further including a servo mechanism for identifying a position on the recording tape.

19. The cartridge system of claim 18, wherein the servo mechanism comprises an optical detector which detects optical indicia on the recording tape, and wherein the optical detector has a predetermined spatial relationship with the recording head.

20. The cartridge system of claim 17, wherein the tape assembly comprises datums accessible through the housing to define a tape position in relation to at least one of the tape drive and the positioning mechanism.

21. The cartridge system of claim 17, wherein the transport path is located inside the tape cartridge.

22. The cartridge system of claim 17, wherein at least during a recording operation, the recording head is located inside the housing.

23. A cartridge system for a tape cartridge, comprising:
  tape drive means for moving a wide recording tape disposed in the tape cartridge along a tape transport path, and
  positioning means for positioning the recording tape relative to a recording head,
  said tape cartridge comprising:
    housing means having a width, a length and a height, said height being smaller than said length and said width, and
    tape support means disposed in said housing means and comprising tape supply means and tape take-up means, said recording tape extending between said supply means and said tape take-up means and having a tape width which is substantially equal to the width of the housing means,
    wherein said tape supply means and tape take-up means are rotatably mounted in the tape support means so as to rotate about respective axes which are substantially parallel to the width of the housing means.

24. A method for recording information on a wide recording tape disposed in a tape cartridge, comprising:
  providing a housing having a width, a length and a height, said height being smaller than said length and said width,
  providing a wide recording tape for transport in a direction substantially perpendicular to the width of the housing along a tape transport path located inside the housing, the wide recording tape having a tape width which is substantially equal to the width of the housing,
  transporting the wide recording tape to a predetermined tape location along the tape transport path,
  inserting a recording head in the housing in a direction perpendicular to the tape transport path,
  positioning the recording head, while inside the housing, relative to a recording track extending substantially parallel to the tape transport path, and
  recording the information on the recording track.

* * * * *